United States Patent
Gruneisen, III

[19]

[11] Patent Number: 6,119,383
[45] Date of Patent: Sep. 19, 2000

[54] CARD HOLDER

[76] Inventor: Albert H. Gruneisen, III, 1800 Spring Dr., Louisville, Ky. 40205

[21] Appl. No.: 08/994,667

[22] Filed: Dec. 19, 1997

[51] Int. Cl.[7] .................................................... G09F 7/00
[52] U.S. Cl. ................................ 40/492; 40/404; 40/536; 248/451; 402/70
[58] Field of Search .............................. 40/373, 376, 390, 40/401, 404, 492, 530, 536; 248/441.1, 450, 451, 452, 453, 454; D20/43; 402/30, 31, 70, 73

[56] References Cited

U.S. PATENT DOCUMENTS

| Re. 29,127 | 2/1977 | Janssen | 40/373 |
|---|---|---|---|
| 788,241 | 4/1905 | Brandt . | |
| 943,961 | 12/1909 | Benjamin | 40/390 |
| 1,061,133 | 5/1913 | Shedd . | |
| 1,107,251 | 8/1914 | Birdsell . | |
| 1,659,395 | 2/1928 | Douglas | 402/70 |
| 1,798,586 | 3/1931 | Burgess . | |
| 2,194,010 | 3/1940 | Cooke . | |
| 2,224,414 | 12/1940 | Spinner . | |
| 2,324,259 | 7/1943 | Havel . | |
| 2,526,575 | 10/1950 | Neal . | |
| 2,877,581 | 3/1959 | Woofter . | |
| 2,934,845 | 5/1960 | Shedd . | |
| 3,079,725 | 3/1963 | Fleur | 248/441.1 |
| 3,979,845 | 9/1976 | Janssen | 40/404 X |
| 4,043,063 | 8/1977 | Ambasz . | |
| 4,365,434 | 12/1982 | Doyel | 40/530 |
| 4,603,995 | 8/1986 | Vilona | 402/73 |
| 4,666,409 | 5/1987 | Sandberg | 40/390 X |
| 4,743,135 | 5/1988 | Gauntlett | 402/70 |
| 5,154,391 | 10/1992 | Hegarty | 248/454 |
| 5,535,976 | 7/1996 | Gruneisen, III | 248/452 |

*Primary Examiner*—Brian K. Green
*Attorney, Agent, or Firm*—Greenbaum Doll & McDonald PLLC; James C. Eaves, Jr.; Daniel C. Stelter

[57] ABSTRACT

A card holder providing a stand, the stand having a base portion, a support portion projecting upwardly from the base portion, and at least one wing projecting outwardly from an upper end of the support portion; a head portion, the head portion being substantially loop-shaped and having a longitudinal slit therethrough, the slit being sized to receive the upper end of the support portion therethrough for removable attachment thereto, the head portion being adaptable to removably receive at least one card, the at least one card being slidingly moveable about the head portion between a first position and a second position thereof; the at least one wing having a U-shaped cut-out therethrough adjacent to the upper end of the support portion for receiving the head portion; and, the upper end having a tapered portion defining at least one slot for receiving an edge of the head portion slit therebehind.

18 Claims, 14 Drawing Sheets

CARD HOLDER

BACKGROUND OF THE INVENTION

1. Technical Field of the Invention

The present invention relates to card holders for use with a plurality of cards moveably attached thereto. More particularly, the present invention relates to a card holder for use with a plurality of cards moveably attached thereto, wherein the cards are displayed thereby in a substantially upwardly-facing orientation therefrom.

2. Discussion of the Related Art

Various devices have been provided by the prior art wherein a plurality of cards may be moveably attachable thereto for selective viewing thereof. For example, such a prior art device might be placed on a table in a restaurant and may include food and drink menus thereby for a patron's perusal or viewing thereof. Even further, such a device may include a plurality of cards having advertisements, product or service directories, fee schedules, photographs, training or how-to information (such as a listing of computer input prompts), or children's book pages provided thereon. Thus, it is desirable to provide a card holder to which a plurality of cards are moveably attachable thereto.

For example, Applicant's U.S. Pat. No. 5,535,976 teaches a card holder to sit on a table in a restaurant and display a menu, drink list or advertising thereby, wherein the cards are typically suspended therefrom in a vertical orientation. Even further, U.S. Pat. No. 2,889,937 to Best teaches a display stand to which a plurality of flat articles, such as, for example, rug, tile or linoleum samples are moveably attached thereto for display. However, it is furthermore desirable to provide a card holder to which a plurality of cards are moveably attached thereto, wherein the cards are displayed thereby in a substantially upwardly-facing orientation therefrom.

SUMMARY OF THE INVENTION

The present invention is for a card holder wherein a plurality of cards are held and displayed thereby in a substantially upwardly-facing orientation therefrom. The card holder includes a stand having a base portion, an upwardly-extending support portion and a pair of outwardly-extending wings. A card-receiving head portion is detachably connected to an upper end of the support portion and is sized to be slidingly received by a clip-receiving slot provided through each card. The outwardly-extending wings are disposed towards the upper end of the support portion downwardly adjacent to the card-receiving head portion and define an upper surface upon which the plurality of cards are permitted to rest and be displayed in a substantially upwardly-facing orientation therefrom.

The card holder base rests flatly on a table, or the like, and the cards rest neatly on respective upper surfaces of either outwardly-extending wing. An individual can flip through the plurality of cards, much like flipping through the pages of a book, to view the information contained on the cards from a comfortable level.

A card holder according to a preferred embodiment of the present invention includes a stand, the stand having a base portion, a support portion projecting upwardly from the base portion, and at least one wing projecting outwardly from an upper end of the support portion; a head portion, the head portion being substantially loop-shaped and having a longitudinal slit therethrough, the slit being sized to receive the upper end of the support portion therethrough for removable attachment thereto, the head portion being adaptable to removably receive at least one card, the at least one card being slidingly moveable about the head portion between a first position and a second position thereof; the at least one wing having a U-shaped cut-out therethrough adjacent to the upper end of the support portion for receiving the head portion; and, the upper end having a tapered portion defining at least one slot for receiving an edge of the head portion slit therebehind.

Even further, the card holder described herein includes a stand having a base and a support extending therefrom, the stand having a front and a back, the support having a base end and a head end and a first side and a second side; means for holding cards being detachably received by the support; the support having a first groove into the support first side and a second groove into the support second side, the first groove and the second groove having a parallel relationship and having a location toward the head end, where the first groove and the second groove detachably receive the holding means, where: the base end and the head end of the support have a non-parallel relationship; the card holder includes a first wing for receiving a card flatly thereon, the first wing extending from the support at a location toward the head end and extending away from the support first side, the first wing and the first groove having a parallel relationship, the first wing having an upper first wing surface; the card holder includes a second wing for receiving a card flatly thereon, the second wing extending from the support at a location toward the head end and extending away from the support second side, the first wing and the second groove having a parallel relationship, the first wing and the second wing having an angle therebetween, the second wing having an upper second wing surface; and, the upper first and second wing surfaces are inclined upwardly in a direction away from the base from the stand front to the stand back.

BRIEF DESCRIPTION OF THE DRAWINGS

A better understanding of the present invention will be had upon reference to the following description in conjunction with the accompanying drawings in which like numerals refer to like parts, and wherein.

DETAILED DESCRIPTION OF THE PREFERRED EMBODIMENT

Figure 1:
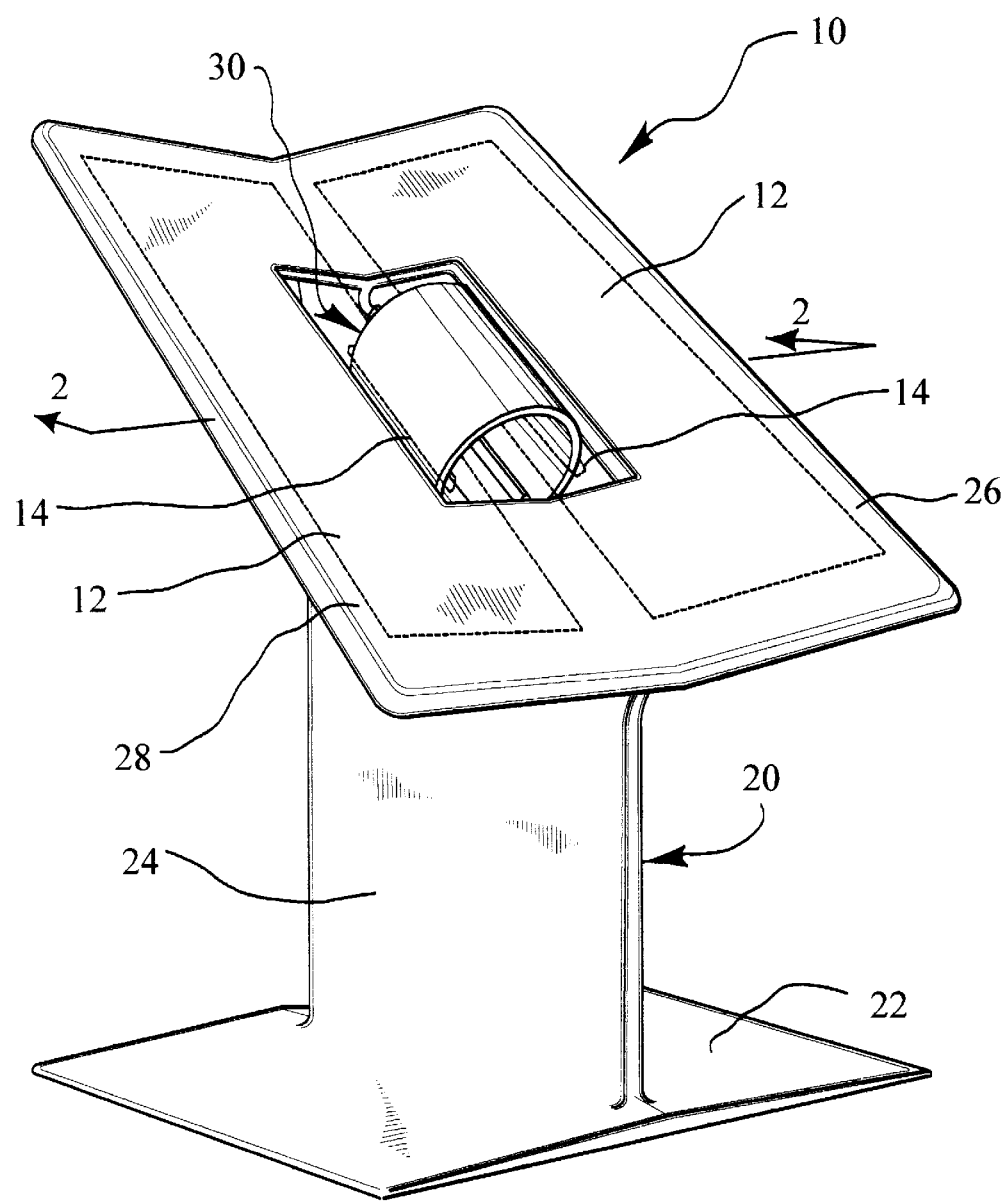
FIG. 1 is a top perspective view of a card holder according to a preferred embodiment of the present invention.
Figure 2:
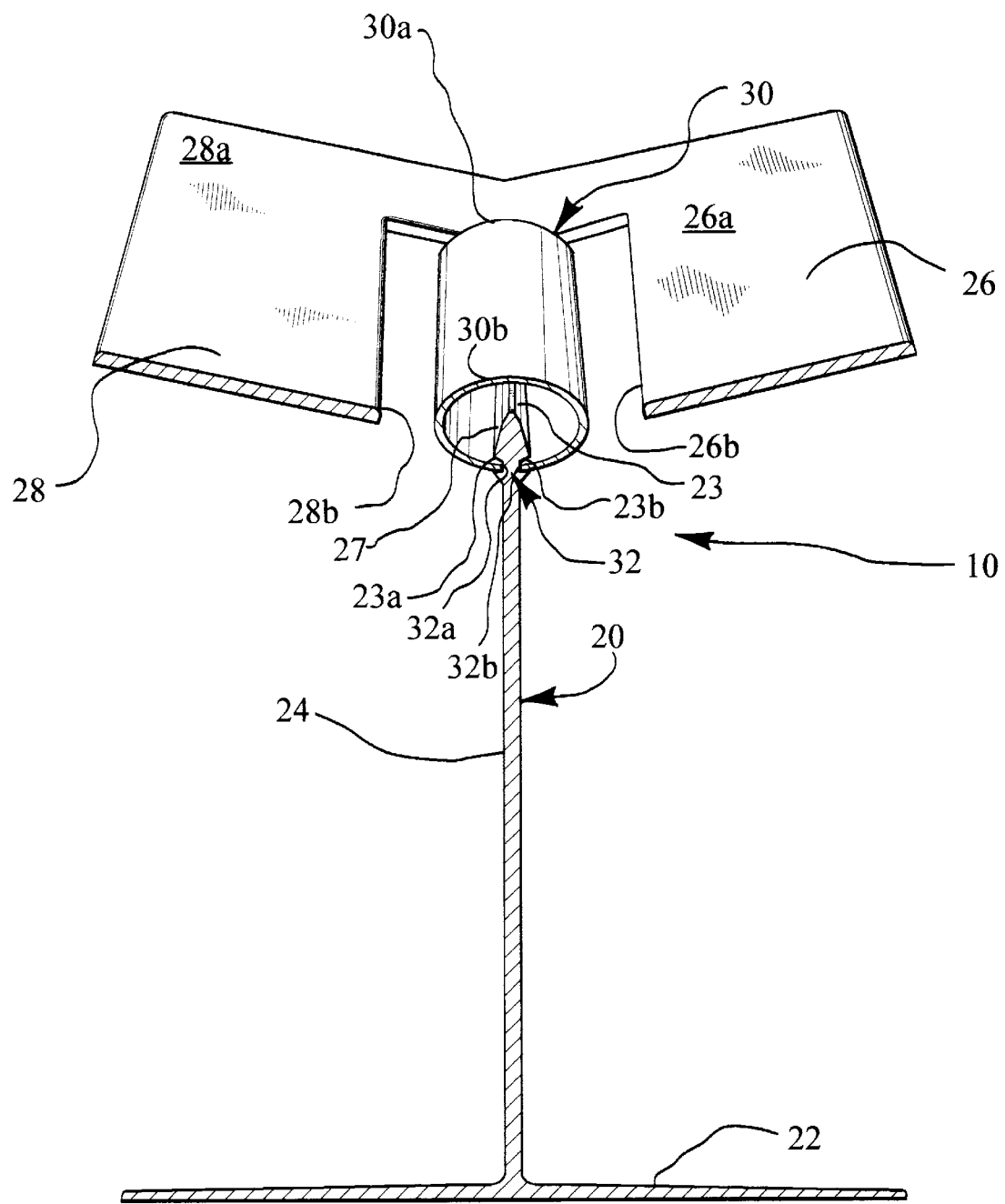
FIG. 2 is a front section view of the card holder of FIG. 1, shown along section line 2—2 of FIG. 1, wherein a card-receiving head portion of the card holder is not shown.
Figure 3:
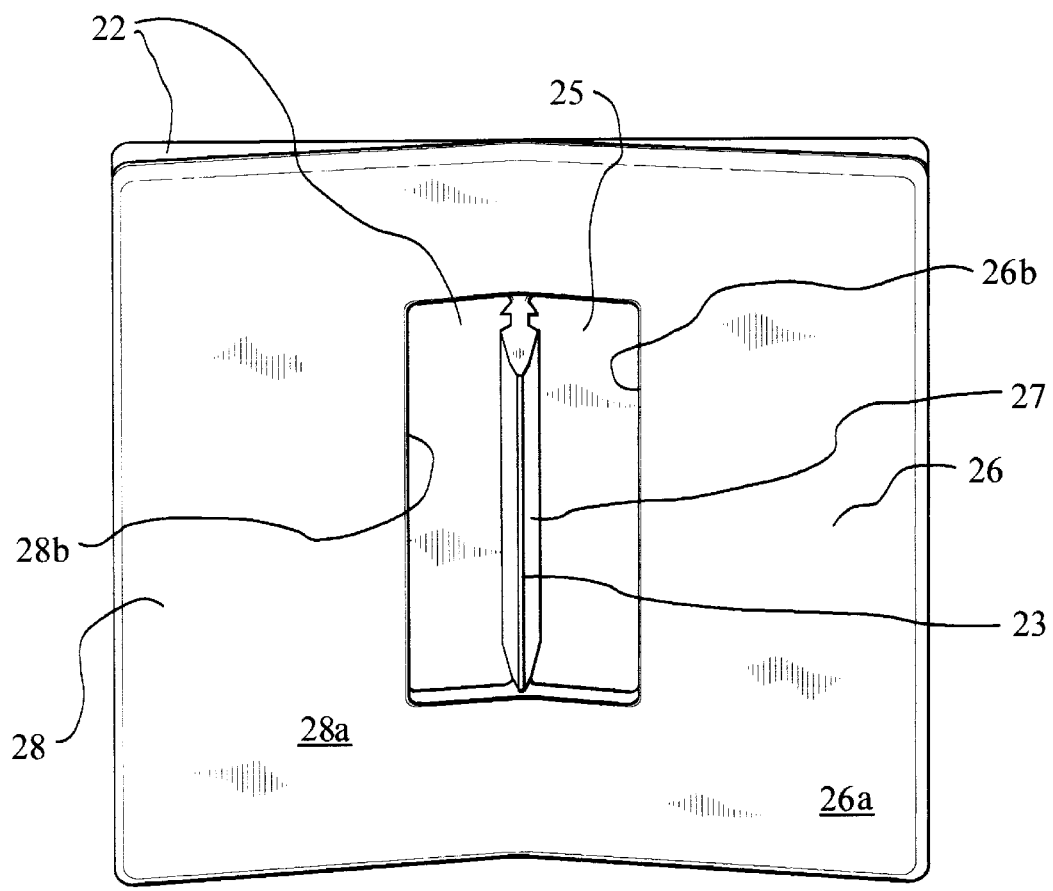
FIG. 3 is a top view of the card holder of FIG. 2.
Figure 4:
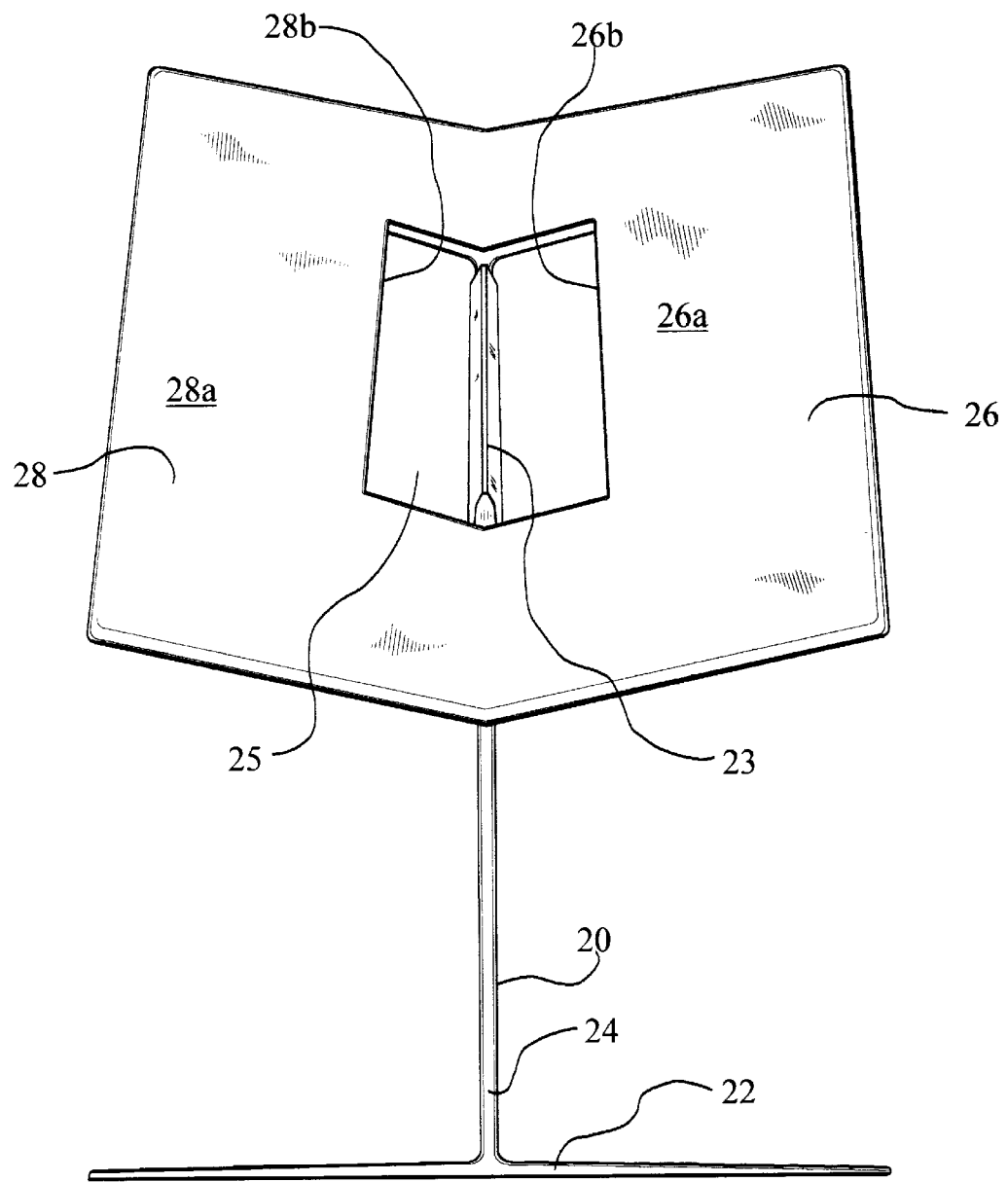
FIG. 4 is a front view of the card holder of FIG. 2.
Figure 5:
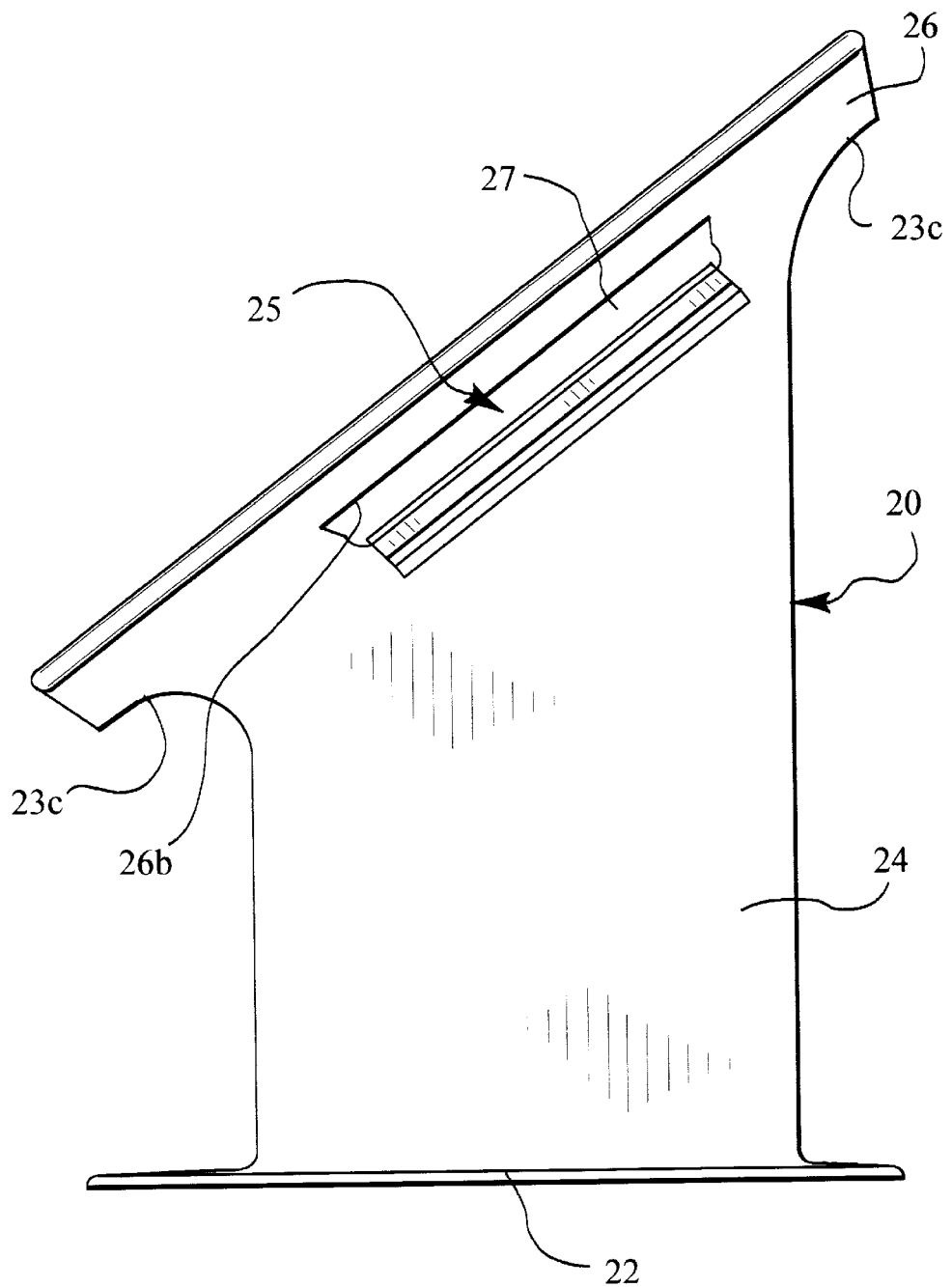
FIG. 5 is a side view of the card holder of FIG. 2.
Figure 6:
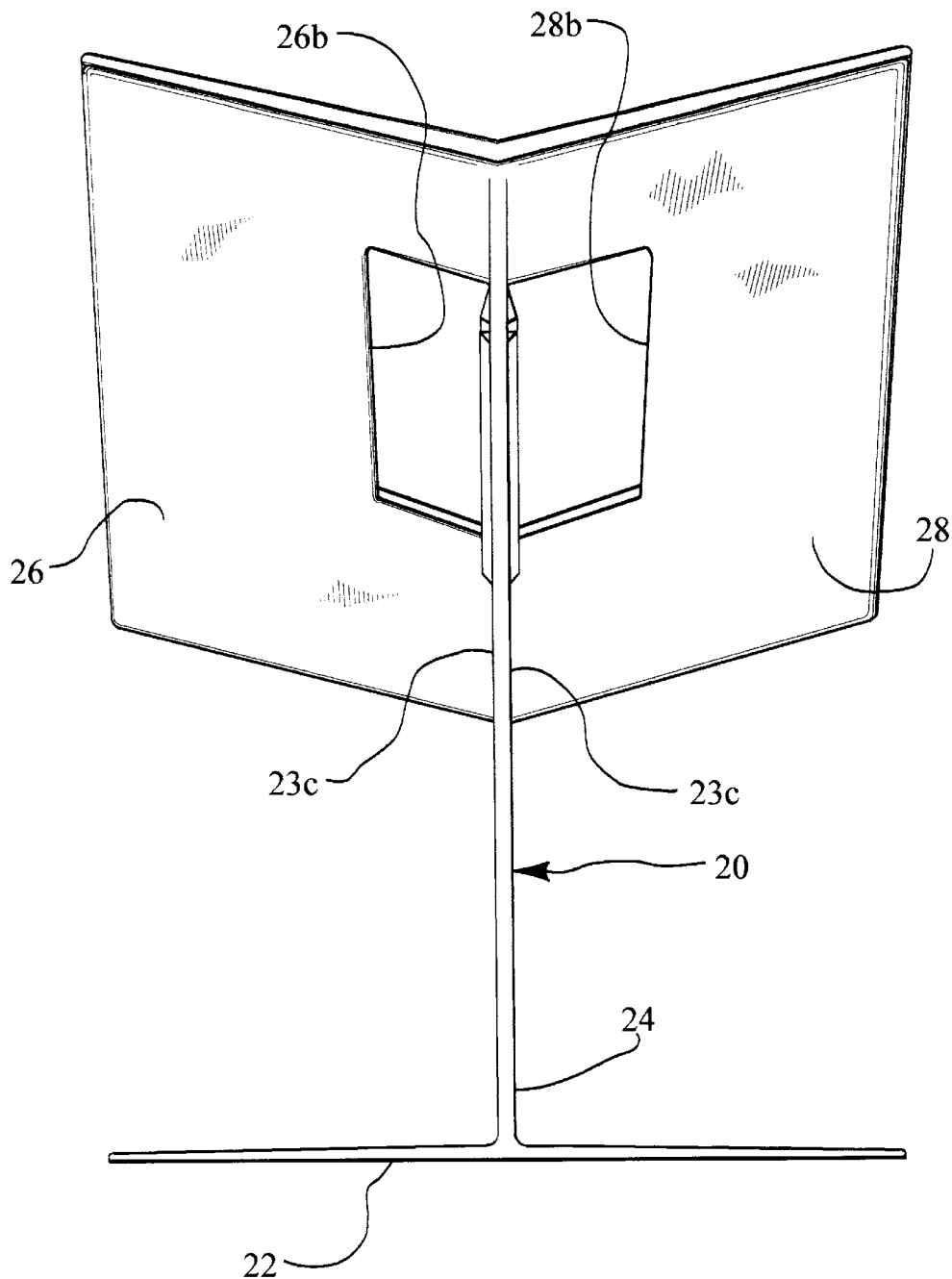
FIG. 6 is a rear view of the card holder of FIG. 2.

With reference to FIGS. 1 and 2, a card holder 10 according to a preferred embodiment of the present invention includes a stand 20 and a card-receiving head portion 30, both preferably constructed from an integrally-moldable polymer. The stand 20 is preferably a one-piece integrally-molded construction and includes a base portion 22, a support portion 24 extending upwardly from the base portion 22 and a pair of substantially opposed wings 26, 28 projecting outwardly from the support portion 24 towards an upper end 23 thereof. Alternatively, the base portion 20 may form a first piece provided separately from both the support portion 24 and the wings 26, 28, which may be integrally-molded together to form a second piece adapted to be snap-fit onto the first piece by any suitable means. The base portion may be constructed from a plastic material, such as the plastic material used to mold the second piece, or may be constructed from a different material, such as, for example, wood.

The base portion 22 may be any desirable shape, such as, for example, square, rectangular, circular or oval, and any desirable cross-section. The base portion 22 is also of a sufficient size or "footprint" to adequately support the card holder 10 in a substantially upright orientation. The support portion 24 and the wings 26, 28 may likewise be of any desirable shape, although the wings 26, 28 are preferably rectangular in shape, when viewed from the top, and the support portion 24 is preferably trapezoidal in shape, when viewed from the side. Each wing 26, 28 and the support portion 24 preferably includes a substantially rectangular cross-section.

With additional reference to FIGS. 3–6, the wings 26, 28 are preferably angled upwardly and outwardly from the support portion 24, symmetrically thereabout, and include upper surfaces 26a, 28a, respectively, substantially lying in planes having an angle therebetween less than 180°. More particularly, the wings 26, 28 are preferably equally angled upwardly towards one another approximately 5°–10°, such that there is an angle of between 160° and 170° between the wings. Alternatively, the wings 26, 28 may be in coplanar alignment with one another. The wing upper surface planes are further inclined upwardly from front-to-back of the stand 20, thereby defining an acute angle between the wing upper surface planes and a plane substantially containing the base portion 22. The wings 26, 28 are preferably integrally molded with the upper end 23 of the support portion 24, which includes an outwardly-flared portion 23c, thereby supporting the wings 26, 28 from downwardly flexure and breaking-off from the support portion 24. Alternatively, the outwardly-flared portion 23c may be replaced with at least one gusset, corner bracket or flange (not shown) integrally molded with the stand 20 to provide support against downwardly flexure or breaking-off of the wings 26, 28 from the support portion 24.

Opposing U-shaped cut-outs 26b, 28b are provided through the wings 26, 28, respectively, and cooperate to define an opening 25 therethrough, whereby the upper end 23 of the support portion 24 is exposed immediately therebelow. The upper end 23 of the support portion 24 includes a downward taper 27, defining slots 23a, 23b, substantially along a length "$l_1$" of the opening 25. The head portion 30 is substantially cylindrical in shape and includes a longitudinal slit 32 therethrough having opposed faces 32a, 32b sized to receive the downward taper 27 of the support portion 24 therebetween.

In use, at least one card 12, and preferably a plurality of cards 12, is provided with a slot 14 therethrough sized to receive the head portion 30 and to be slidingly attached thereto. The head portion 30, having the cards 12 slidingly attached thereto, is positioned over the opening 25 and detachably snapped downwardly therethrough and onto the upper end 23 of the support portion 24 such that the slit 32 provided through the head portion 30 receives the downward taper 27 of the upper end 23 of the support portion 24 and the opposing faces 32a, 32b of the slit 32 are seated within the slots 23a, 23b, respectively, thereby locking the head portion 30 onto the support portion 24, and preventing either upward or downward movement of the head portion 30 relative to the stand 20. Even further, the head portion 30 is prevented from longitudinal translational movement within the opening 25 relative to the stand by transverse edges of the slots 23a, 23b. Alternatively, the head portion 30 could be prevented from longitudinal translational movement within the opening 25 relative to the stand 20 by transverse edges of the cut-outs 26b, 28b abutting an upper and lower end 30a, 30b of the head portion 30, respectively.

The cards 12 rest flatly on the upper surfaces 26a, 28a of the wings 26, 28 and may be transferred from one upper surface to another, such as, for example, from surface 26a, along head portion 30 to surface 28a, much like flipping through the pages of a book. The cards 12, and more particularly, the information contained on either side thereof, is readily viewable by an individual from a comfortable level.

The cards 12, or any individual card 12 thereof, may be replaced or removed from the head portion 30 (and additional cards 12 may be added thereto) simply by applying sufficient upwardly-directed force to the head portion 30 to permit the opposing faces 32a, 32b of the slit 32 to overcome the downward taper 27, thereby releasing opposing faces 32a, 32b of the head portion slit 32 from within the slots 23a, 23b, respectively. The cards 12 may then be removed from the head portion 30, which may be re-attached to the upper end 23 of the support portion 24 as described hereinabove. The head portion 30 is constructed from a material having sufficient resilient memory such that repeated attachment and removal of the head portion 30 from the support portion 24 is permitted without a substantial decrease in operation.

Figure 7:
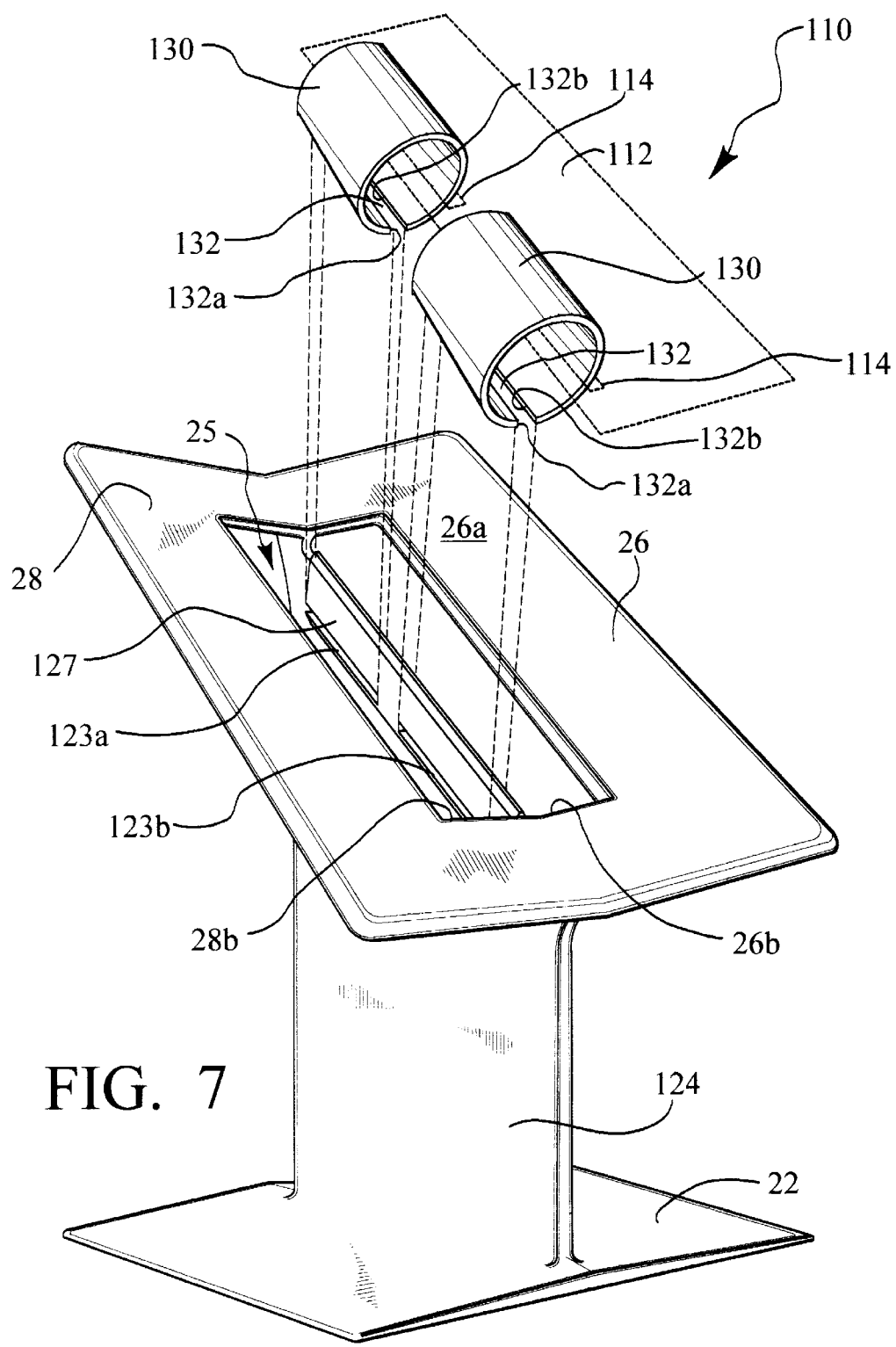
FIG. 7 is a top perspective view of a card holder according to another embodiment of the present invention.

With reference to FIG. 7, a card holder 110 according to an alternative embodiment of the present invention includes many components in common with the card holder 10 according to the preferred embodiment thereof, and like reference numerals are intended to represent like components. However, according to the present embodiment, the head portion 30 of the preferred embodiment is replaced with a plurality of head portion segments 130, each head portion segment 130 having a longitudinal slit 132 provided therethrough, defining opposed faces 132a, 132b thereof. A support portion 124 extending upwardly from the base portion 22 of the preferred embodiment includes a downward taper 127 defining a plurality of discontinuous slots 123a, 123b provided therein for respectively receiving opposed faces 132a, 132b of the slit 132 therein. The at least one card 112 is provided with a plurality of slots 114, each slot 114 respectively corresponding to, and for respectively receiving, one of the plurality of head portion segments 130.

Attachment of the at least one card 112 to the plurality of head portion segments 130, and attachment of the head portion segments 130 to their respective slots 123a, 123b is as according to the preferred embodiment described hereinabove.

Figure 8:
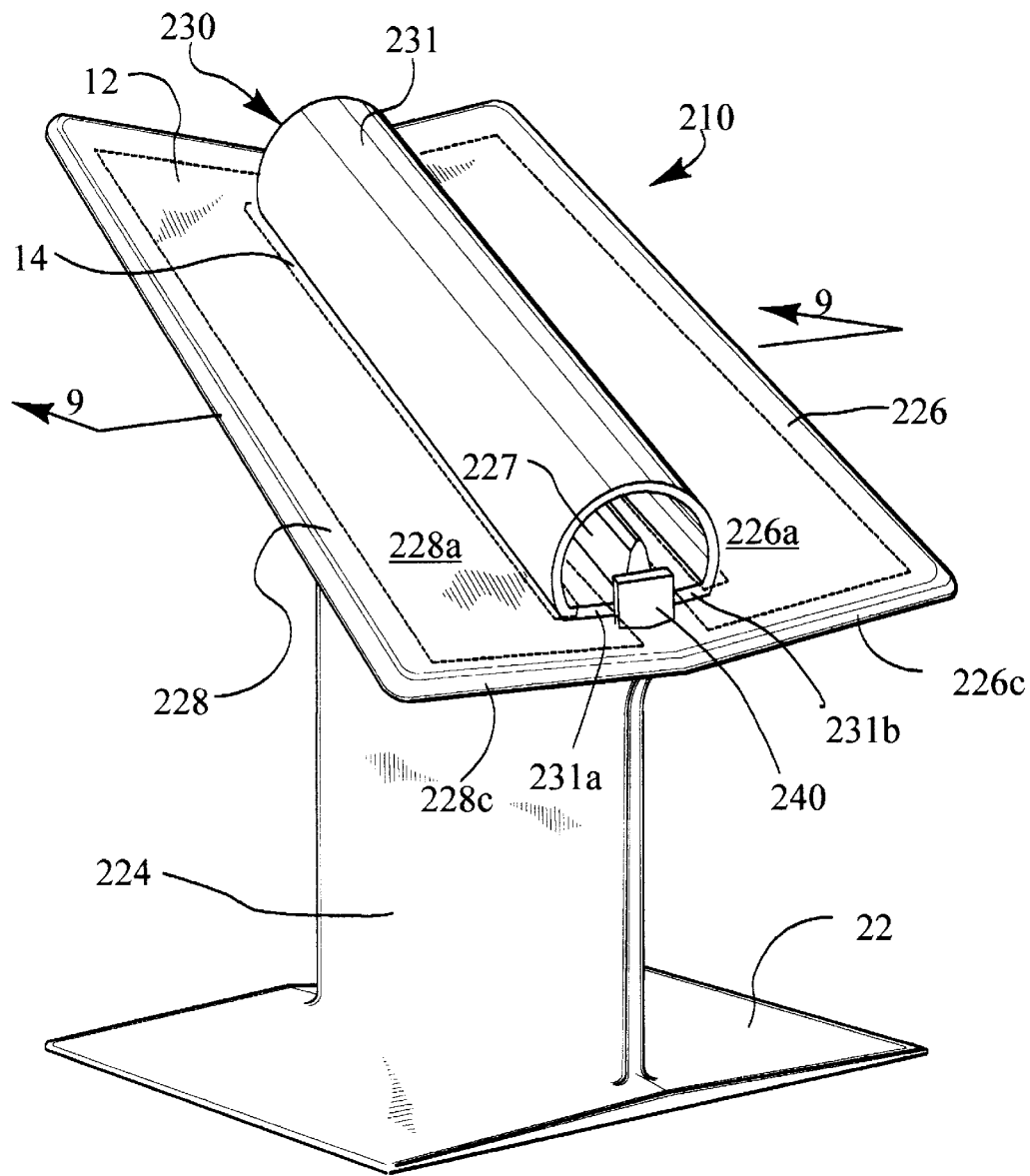
FIG. 8 is a top perspective view of a card holder according to another embodiment of the present invention.
Figure 9:
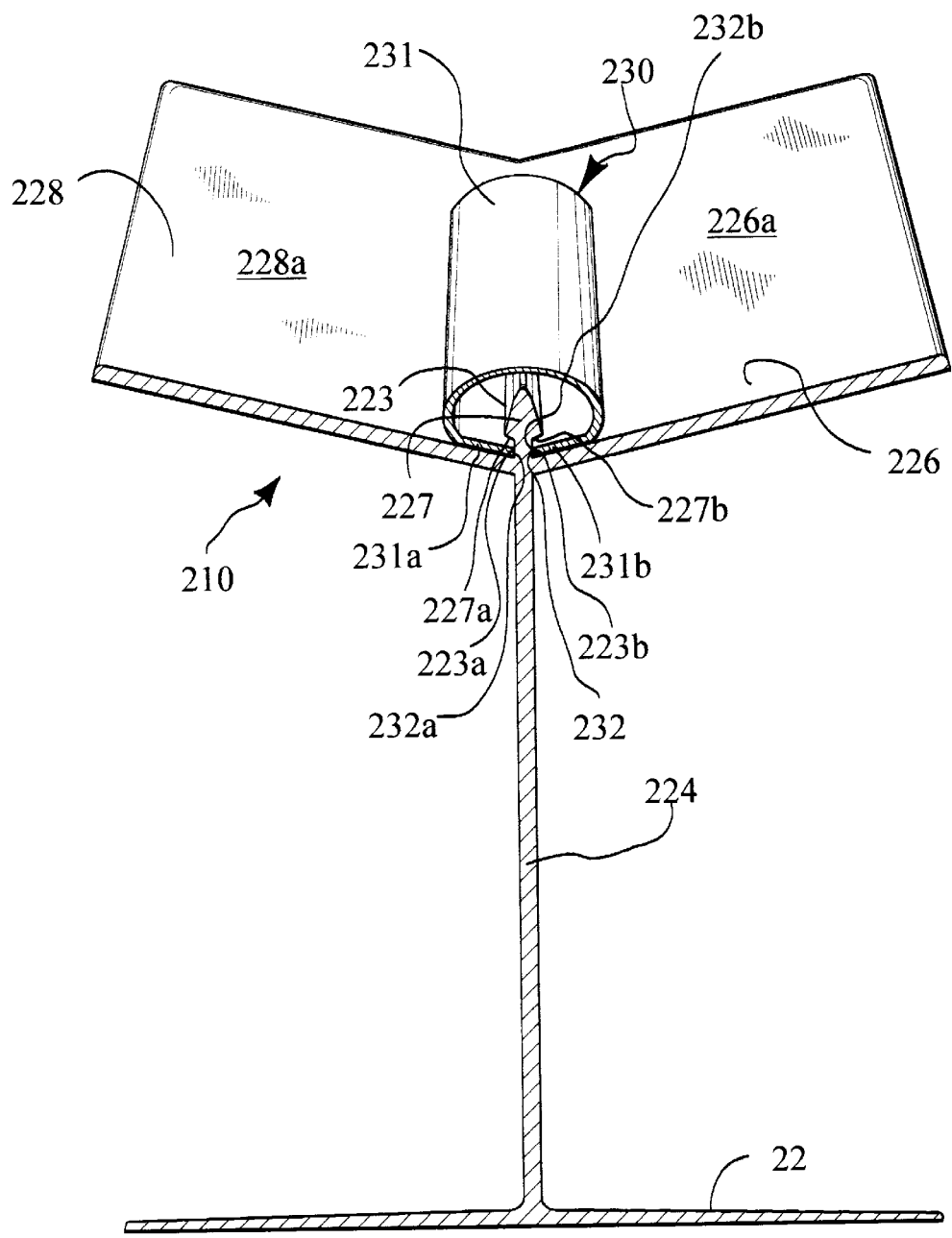
FIG. 9 is a front section view of the card holder of FIG. 8, shown along section line 9—9 of FIG. 8.

With reference to FIGS. 8 and 9, a card holder 210 according to another alternative embodiment of the present invention includes many components in common with the card holder 10 according to the preferred embodiment thereof, and like reference numerals are intended to represent like components. However, according to the present embodiment, a support portion 224 extends upwardly from the base portion 22 of the preferred embodiment and includes an upper end 223 being disposed vertically above a pair of wings 226, 228 projecting upwardly and outwardly from the support portion 224 as according to the preferred embodiment. The wings 226, 228 include a continuous cross-section and define grooves 223a, 223b between an upper surface 226a, 228a of the wings 226, 228 and abutments 227a, 227b defined by a downward taper 227 provided at the upper end 223 of the support portion 224. The grooves 223a, 223b are sized to receive opposing faces 232a, (not shown) 232b of a longitudinal slit 232 (not shown) provided through a head portion 230.

The head portion 230 includes a rounded portion 231, and flattened portions 231a, 231b projecting outwardly from the slit 232 (not shown) on either side thereof and at an angle therefrom selected to permit the flattened portions 231a, 231b to lie substantially flatly against the upper surfaces 226a, 228a of the wings 226, 228. Alternatively, the head portion 230 may include a substantially ring-shaped cross-section as described hereinabove for the head portion 30 according to the preferred embodiment.

A stop 240 projects upwardly from the wings 226, 228 towards respective lower ends 226c, 228c thereof and may be integrally molded therewith. The at least one card 12 is attached to the head portion 230 as hereinabove described and the head portion 230 is slidingly received by the downward taper 227 into position over the wings 226, 228. More particularly, the head portion 230 is translationally fit upon the downward taper 227 by aligning the opposing faces 232a, 232b with the grooves 223a, 223b and sliding the head portion 230 downwardly over along the downward taper 227. The stop 240 prevents the head portion 230 from translational movement beyond the respective lower ends 226c, 228c of the wings 226, 228 and keeps the at least one card 12 in alignment with the wings 226, 228.

Figure 10:
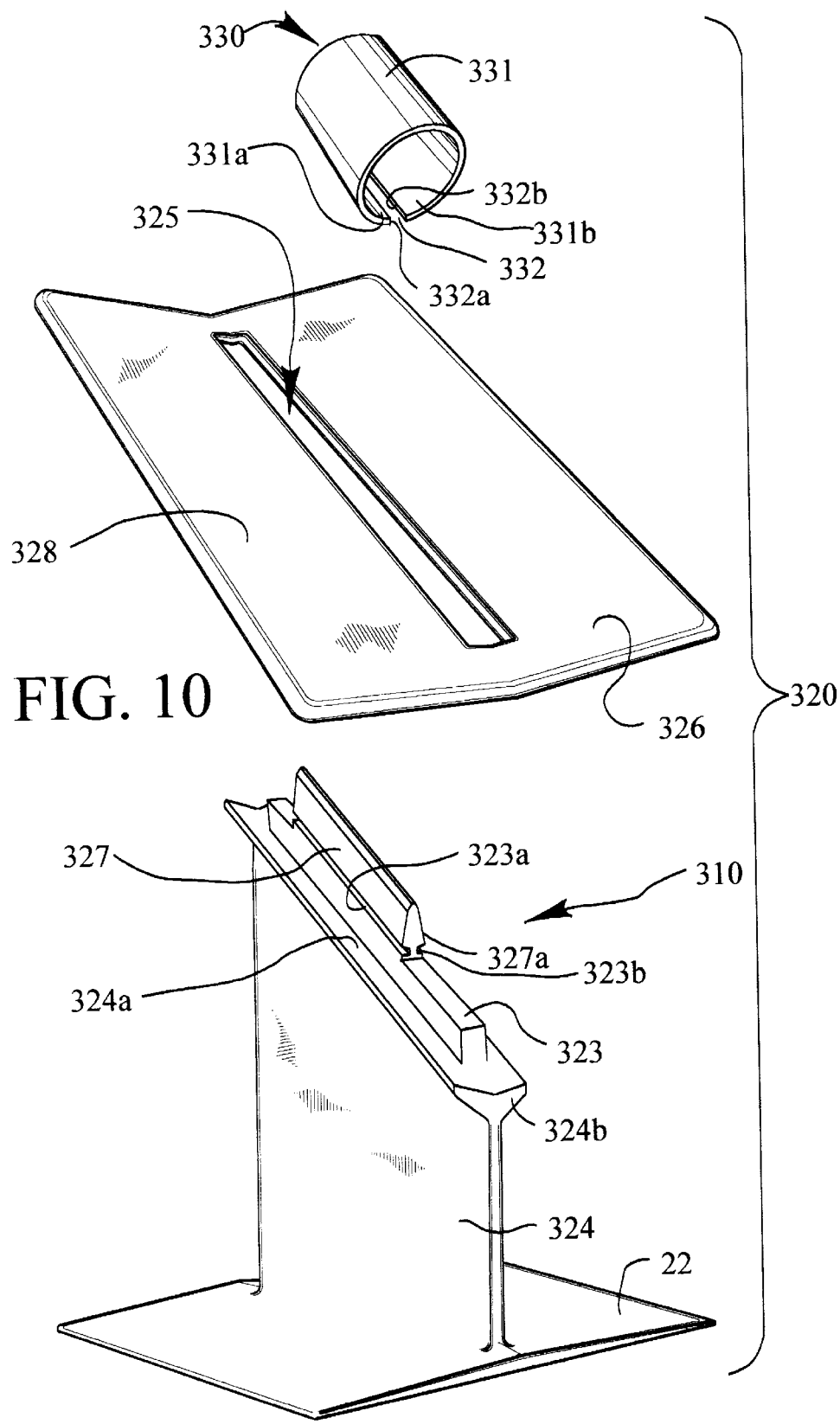
FIG. 10 is an exploded top perspective view of a card holder according to another embodiment of the present invention.

With reference to FIG. 10, a card holder 310 according to another alternative embodiment of the present invention includes many components in common with the card holder 10 according to the preferred embodiment thereof, and like reference numerals are intended to represent like components. However, according to the present embodiment, the card holder 310 is of at least 3-piece construction wherein the base portion 22 and a support portion 324 projecting upwardly therefrom are integrally molded with one another and form a first piece, the wings 326, 328 are integrally molded with one another and form a second piece, and the head portion 330 forms a third piece.

The wings 326, 328 include an opening 325 sized to receive an upper end 323 of the support portion 324 therethrough. The support portion 324 includes first and second ridges 324a, 324b projecting outwardly from opposing surfaces of the support portion 324 towards the upper end 323 thereof a sufficient distance to permit the wings 326, 328 to rest thereupon. The ridges 324a, 324b are angled from front-to-back of the stand 320 such that the wings 326, 328 will be angled accordingly upon engagement therewith. The upper end 323 of the support portion 324 includes a projection 327a having a downward taper 327 defining slots 323a, 323b substantially along a length "$l_2$" of the projection 327a.

The head portion 330 may be of any shape or configuration hereinabove described, although is preferably shaped having a rounded portion 331 and flattened portions 331a, 331b projecting outwardly from a longitudinal slit 332 provided therethrough. The slit 332 includes opposing faces 332a, 332b sized to receive the downward taper 327 of the projection 327a.

The card holder 310 according to the present embodiment is assembled by attaching the at least one card 12 to the head portion 330 as described hereinabove. The projection 327a is inserted upwardly through the opening 325 and the head portion 330 is snapped downwardly onto the projection 327a so that the opposing faces 332a, 332b of the slit 332 seat within the slots 323a, 323b. The wings 326, 328 are secured to the support portion 324 between the ridges 324a, 324b thereof and the flattened portions 331a, 331b of the head portion 330. The head portion 330 is prevented from moving in any direction relative to the stand 320 by the opposing faces 332a, 332b being seated securely within the slots 323a, 323b.

Alternatively, an upper end of the slots 323a, 323b may communicate with a rear edge of the support portion 324, thereby permitting the head portion 330 to be translationally received by the slots 323a, 323b from rear-to-front of the stand 320 and into position over the wings 326, 328.

Figure 11:
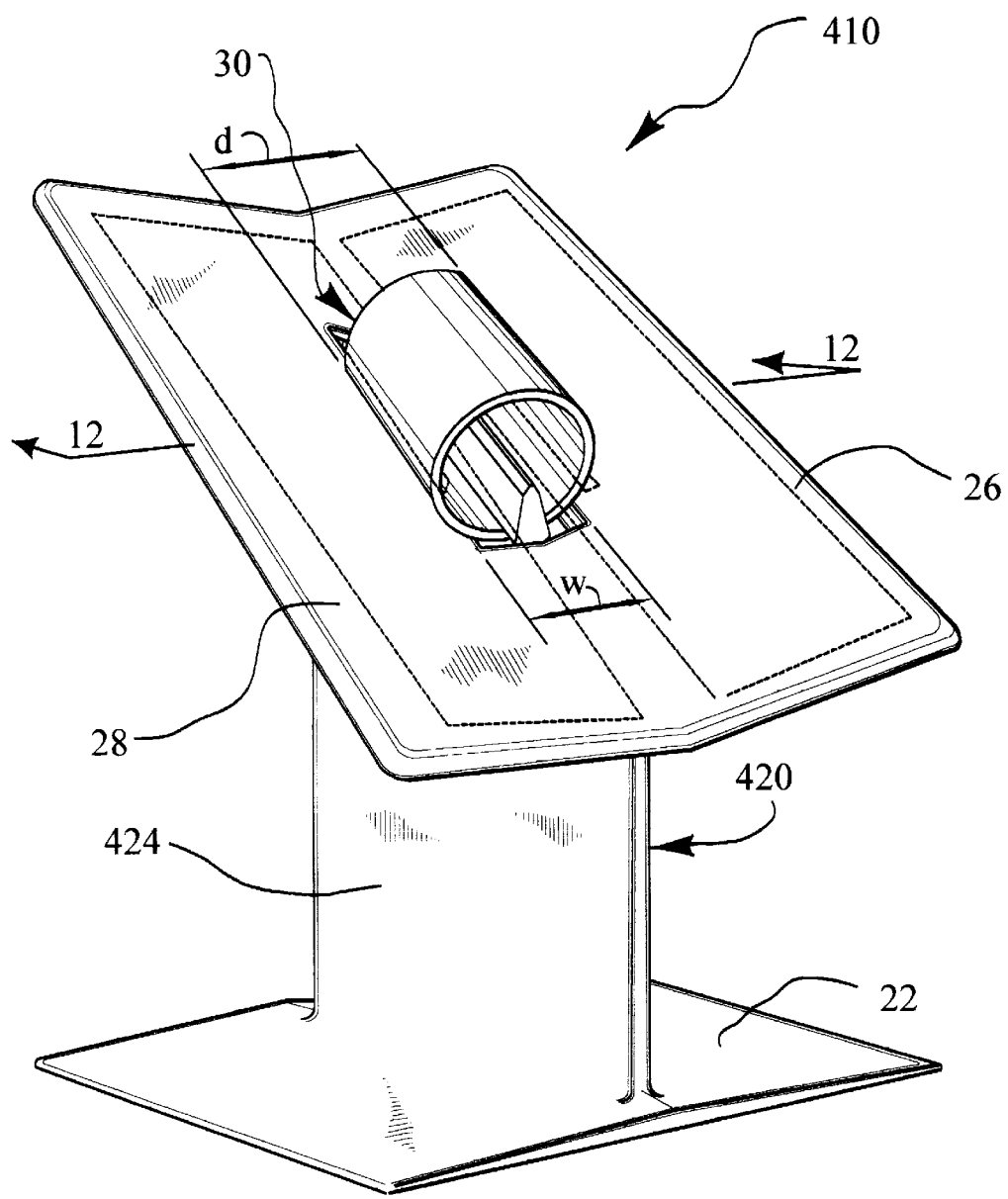
FIG. 11 is a top perspective view of a card holder according to another embodiment of the present invention.
Figure 12:
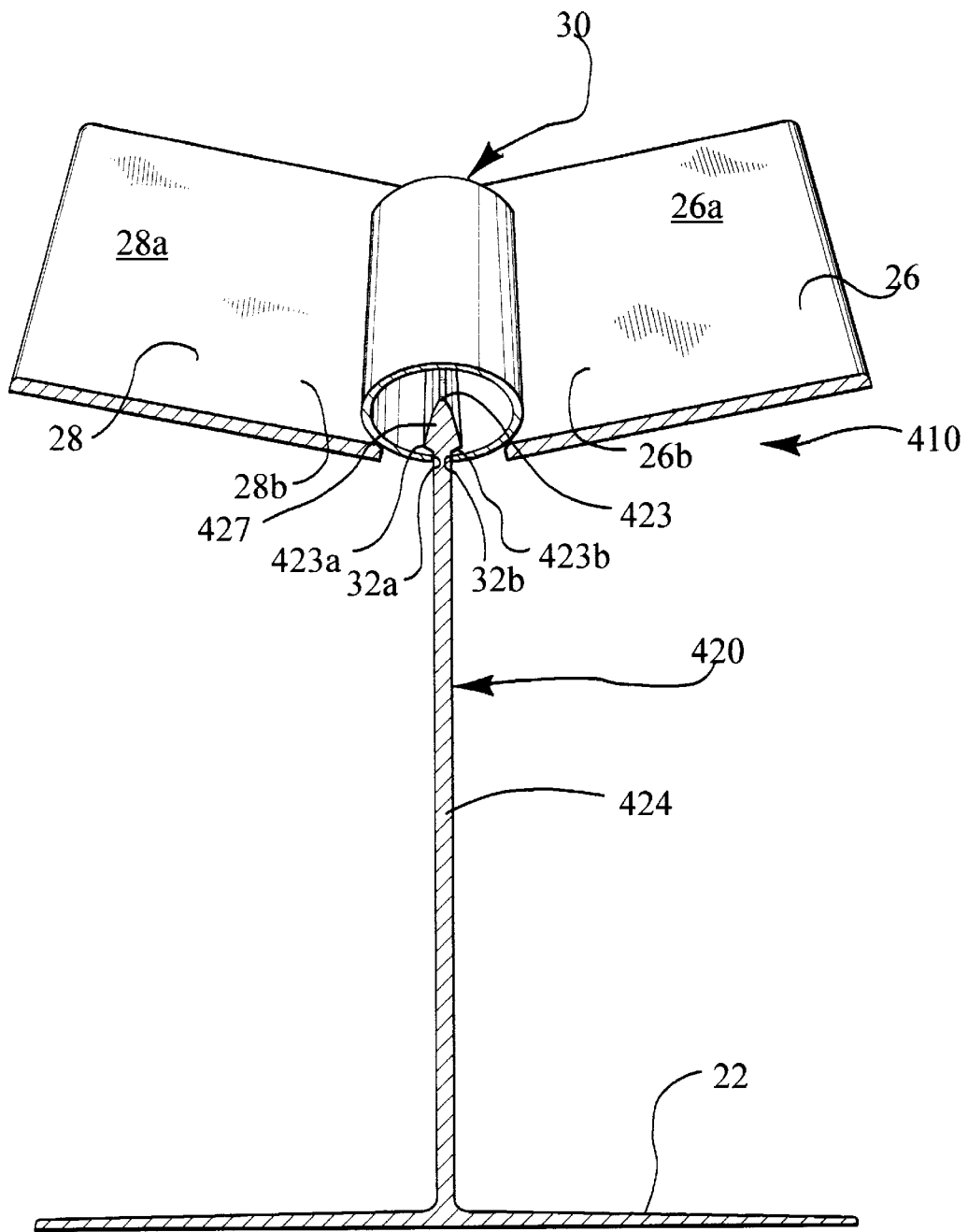
FIG. 12 is a front section view of the card holder of FIG. 11, shown along section line 12—12 of FIG. 11.

With reference to FIGS. 11 and 12, a card holder 410 according to another alternative embodiment of the present invention includes many components in common with the card holder 10 according to the preferred embodiment thereof, and like reference numerals are intended to represent like components. However, a support portion 424 includes an upper end 423 having a downward taper 427 defining abutments 423a, 423b. The head portion 30, having the at least one card 12 slidingly attached thereto as hereinabove described, is positioned over the opening 25 and detachably snapped downwardly therethrough and onto the upper end 423 of the support portion 424 such that the slit 32 provided through the head portion 30 receives the downward taper 427 and the opposing faces 32a, 32b of the slit 32 are seated downwardly adjacent the abutments 423a, 423b, thereby detachably locking the head portion 30 onto the support portion 424 and preventing upward movement of the head portion 30 relative to the stand 420.

It is preferable that downward movement also be prevented. Accordingly, the head portion 30 includes an outer diameter "d" being greater than a width "w" of the opening 25. Thus, a lower discontinuous arcuate segment of the head portion 30 passes downwardly through the opening 25, forcing the head portion slit 32 to receive the downward taper 427 and forcing the opposing faces 32a, 32b of the slit 32 to be seated behind the respective abutments 423a, 423b. However, the head portion 30 rests on the upper surfaces 26a, 28a of the wings 26, 28 along the cut-outs 26b, 28b. The relative dimensions of the diameter "d" and the width "w" are sized such that the head portion 30 is permitted to rest on the upper surfaces 26a, 28a at approximately the same time the opposing faces 32a, 32b of the slit 32 pass downwardly behind the abutments 423a, 423b. Even further, the head portion 30 is prevented from longitudinal translational movement within the opening 25 relative to the stand 420 by the cut-outs 26b, 28b abutting an upper and lower end 30a, 30b of the head portion 30, respectively.

Figure 13:
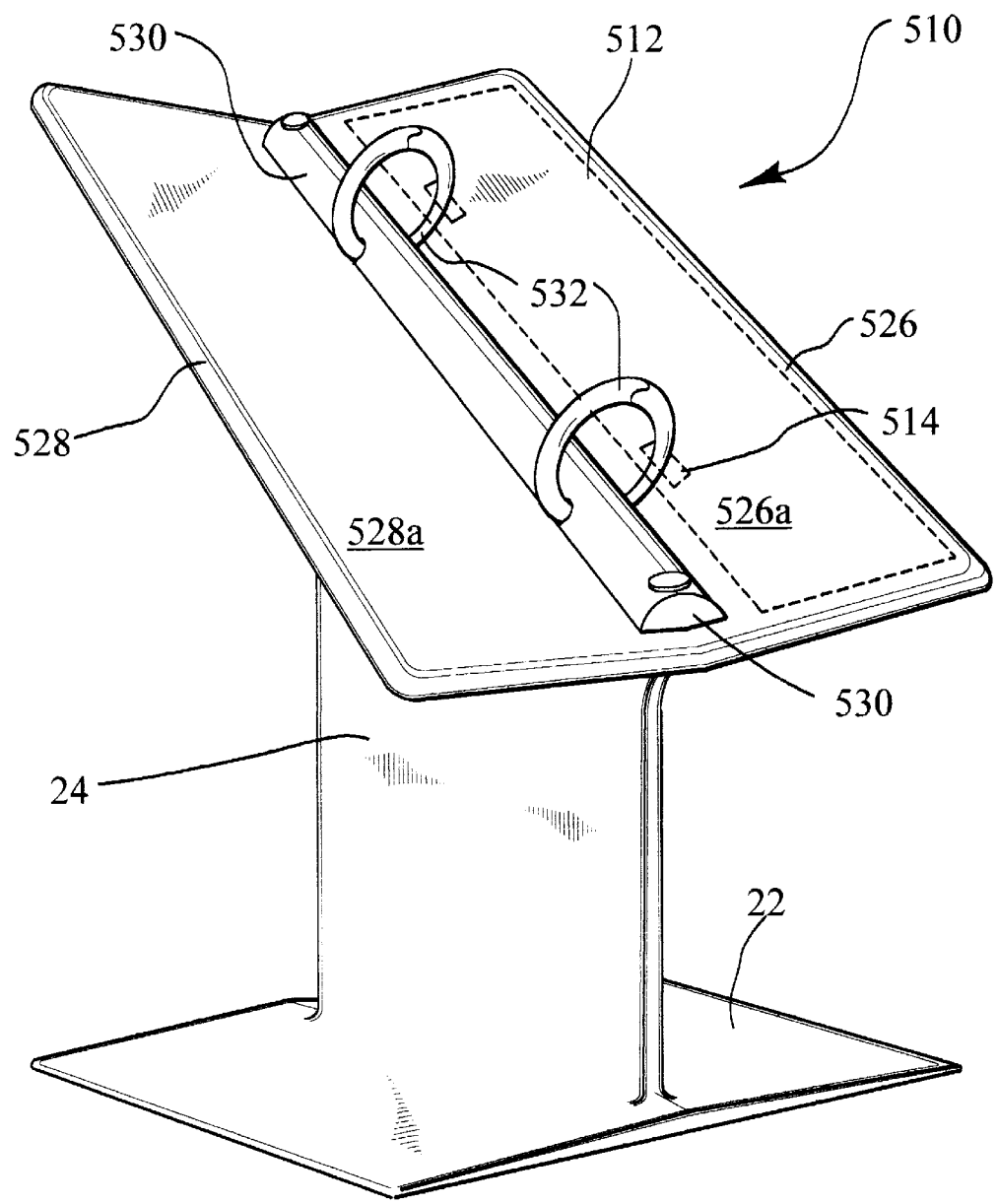
FIG. 13 is a top perspective view of a card holder according to another embodiment of the present invention; and, FIG. 14 is a top perspective view of a card holder according to another embodiment of the present invention.

With reference to FIG. 13, a card holder 510 according to another alternative embodiment of the present invention includes many components in common with the card holder 10 according to the preferred embodiment thereof, and like reference numerals are intended to represent like components. However, the outwardly-extending wings 526, 528 according to the present embodiment includes a continuous cross-section. More particularly, the cutouts 26b, 28b provided through the wings 26, 28 of the preferred embodiment are not provided through the wings 526, 528 according to the present embodiment.

A clip-ring spine 530 is attached, such as, for example, by gluing, to upper surfaces 526a, 528a of the wings 526, 528 along a line upwardly adjacent to the upper end 23 of the support portion 24. The clip-ring spine 530 may be of a known structure, such as, for example, as provided within a 3-ring binder, and is proportioned according to the dimensions of the card holder 510.

The clip-ring spine 530 is provided with at least one clip-ring 532 projecting upwardly therefrom. Preferably, a plurality of clip-rings 532 are provided projecting upwardly therefrom and are sized and positioned to be received by a plurality of holes or apertures 514 provided through at least one card 512.

The clip-ring 530 is provided with means to move between an open position, whereat cards 512 may be added thereto, and a closed position, whereat cards 512 are slidingly moveable between the upper faces 526a, 528a of the wings 526, 528 along the clip-ring 530.

Figure 14:
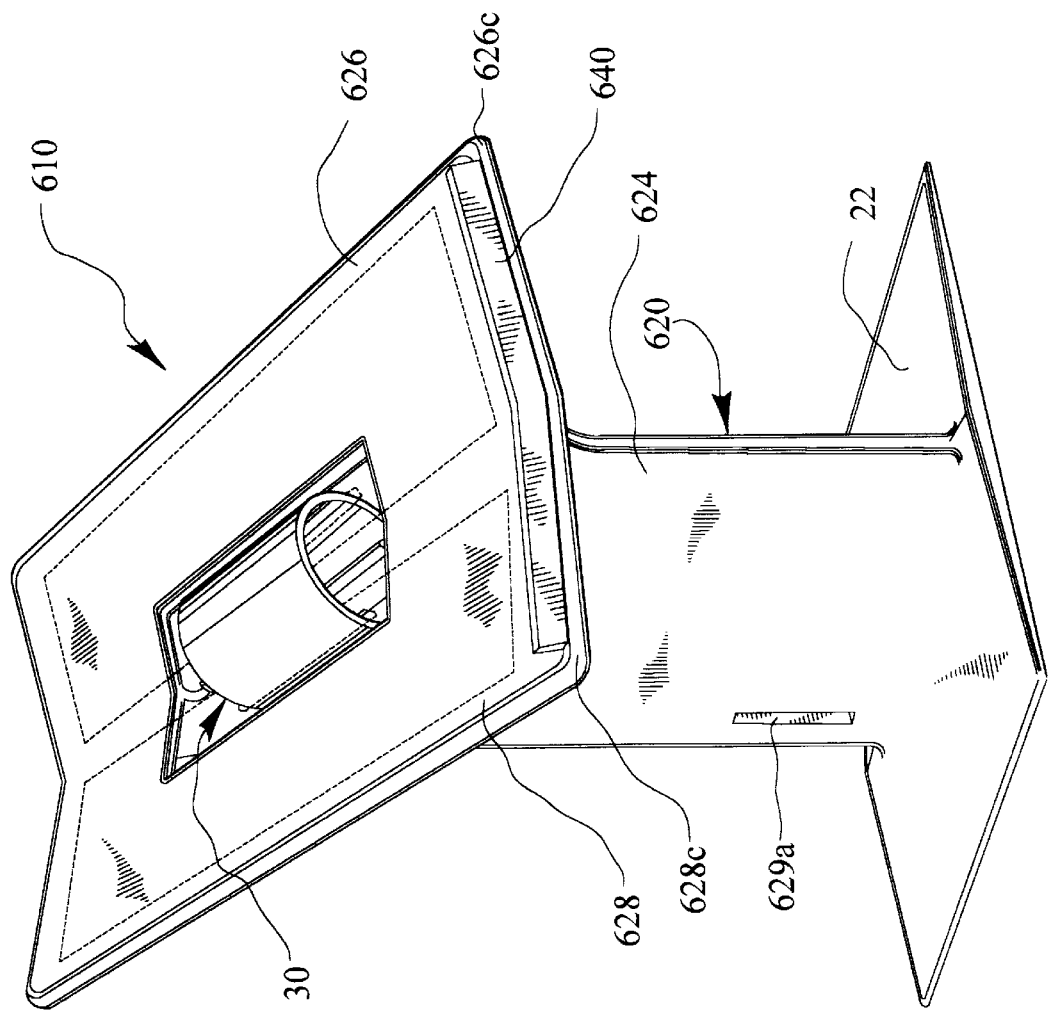

With reference to FIG. 14, a card holder 610 according to another alternative embodiment of the present invention includes many components in common with the card holder 10 according to the preferred embodiment thereof, and like reference numerals are intended to represent like components. However, the card holder 610 according to the present embodiment of the present invention further includes a pair of opposed grooves 629a, 629b (groove 629a only being shown) in a support portion 624 of a stand member 620 near a rear edge thereof. The grooves 629a, 629b are sized to received opposed faces 32a, 32b of the head portion 30 for storage thereon. Alternatively, a plurality of grooves (not shown) may be provided to receive a plurality of head portion segments such as described hereinabove.

A stop 640 projects upwardly from the wings 626, 628 near respective lower ends 626c, 628c thereof and substantially along respective lengths thereof. The stop 640 is sized to prevent pens, pencils or the like from rolling downwardly over the lower ends 626c, 628c. The stop 640 may also support a book, cards, papers or other flat articles from sliding downwardly over the lower ends 626c, 628c.

Although the present invention has been described in terms of specific embodiments which are set forth in detail, it should be understood that this is by illustration only and that the present invention is not necessarily limited thereto, since alternative embodiments not described in detail herein will become apparent to those skilled in the art in view of the disclosure. Accordingly, modifications are contemplated which can be made without departing from either the spirit or the scope of the present invention as described hereinabove.

I claim:

1. A card holder, comprising:
    a stand, said stand having a base portion, a support portion projecting upwardly from said base portion, and at least one wing for receiving a card flatly thereon, said at least one wing projecting outwardly from said support portion, said at least one wing being at a location towards an upper end of said support portion; and,
    at least one head portion segment, said at least one head portion segment being substantially loop-shaped and having a longitudinal slit therethrough, said slit being sized to receive said upper end of said support portion therethrough for removable attachment thereto; and,
    where said at least one wing includes a pair of integrally-molded opposed wings projecting outwardly from a center portion thereof, said center portion having a slot therethrough for receiving said upper end of said support portion therethrough;
    said support portion includes a pair of opposed stops projecting outwardly therefrom, said opposed stops being sized to support said opposed wings around an outer periphery of said slot; and,
    whereby attaching said at least one head portion to said upper end of said support portion when said upper end of said support portion is received by said slot through said opposed wings sandwiches said opposed wings between said at least one head portion of said opposed stops.

2. A card holder, comprising:
    a stand, said stand having a base portion, a support portion projecting upwardly from said base portion, and at least one wing for receiving a card flatly thereon, said at least one wing projecting outwardly from said support portion, said at least one wing being at a location towards an upper end of said support portion;
    a head portion for removably receiving a card, said head portion being substantially loop-shaped and having a longitudinal slit therethrough, said slit being sized to receive said upper end of said support portion therethrough for removable attachment thereto;
    said at least one wing having an opening therethrough upwardly adjacent said upper end of said support portion for receiving said head portion; and,
    said upper end having a tapered portion defining at least one slot therein for receiving an edge of said head portion slit therebehind.

3. The card holder of claim 2, wherein: said at least one wing projects upwardly and outwardly substantially within a wing plane, said wing plane being oblique to a plane substantially containing said base portion.

4. The card holder of claim 2, wherein:
    said base portion, said support portion and said at least one wing are integrally formed.

5. A card holder, comprising: a stand, said stand having a base and a support extending therefrom, said stand having a front and a back, said support having a base end and a head end, said support having a first side and a second side; means for holding cards, said holding means being detachably received by said support; said support having a first groove into said support first side and a second groove into said support second side, said first groove and said second groove having a parallel relationship and having a location toward said head end, where said first groove and said second groove detachably receive said holding means, where:
    (a.) said base end and said head end of said support having a non-parallel relationship;
    (b.) said card holder includes a first wing for receiving a card flatly thereon, said first wing extending from said support at a location toward said head end and extending away from said support first side, said first wing and said first groove having a parallel relationship, said first wing having an upper first wing surface;

(c.) said card holder includes a second wing for receiving a card flatly thereon, said second wing extending from said support at a location toward said head end and extending away from said support second side, said first wing and said second groove having a parallel relationship, said first wing and said second wing having an angle therebetween, said second wing having an upper second wing surface; and, (d.) said upper first and second wing surfaces are inclined upwardly in a direction away from said base from said stand front to said stand back.

6. The card holder of claim 5 where said angle does not exceed 180°.

7. The card holder of claim 5 where said angle is between 160° and 170°.

8. The card holder of claim 5 where said support and said first and said second wings are of unitary construction.

9. The card holder of claim 8, where said first and said second wings have an opening therethrough, said opening permitting said first groove and said second groove to detachably receive said holding means.

10. The card holder of claim 9, where said opening has a pair of parallel edges, and where when said holding means is detachably received by said first groove and said second groove, said holding means engages said pair of parallel edges.

11. The card holder of claim 5 where said support is of a first construction and said first and said second wings are of a second construction, said first and said second wings having an opening therethrough, said opening receiving said support head end, said first and said second wings received by a support ridge thereunder and retained thereon by said holding means.

12. The card holder of claim 5 where said holding means comprises a head portion, said head portion having opposing ends in a cooperating relationship, said opposing ends being detachably received by said first and said second grooves.

13. The card holder of claim 12, where said head portion has a generally circular cross-section.

14. The card holder of claim 12, where said support includes at least a second first groove into said support first side and in linear alignment with said first groove and at least a second second groove into said support second side and in linear alignment with said second groove, said holding means further comprising at least a second head portion having opposing ends in a cooperating relationship, said opposing ends being detachably received by said second first groove and said second second groove.

15. The card holder of claim 5 where said holding means is slidably received by said first and said second grooves, said first and second wings having a stop thereon, said stop engaging said holding means when said holding means has been slidably received by said first and said second grooves.

16. The card holder of claim 5 where said support head end has an enlarged head portion, said enlarged head portion having an expanding tapered portion from said head end to said first and said second grooves.

17. The card holder of claim 5, further comprising at least one card, said at least one card having a top, a bottom, a left side, a right side, a front, and a back, said at least one card having a head slot therethrough toward said left side, said holding means receiving said head slot to retain said at least one card thereon, said at least one card being movable from a first position, where said back of said at least one card can be flatly received by said second wing, and a second position, where said front of said at least one card can be flatly received by said first wing.

18. The card holder of claim 5, where said support further comprises at least one substantially vertical groove therein for alternatively receiving and holding said holding means.

* * * * *